US010744849B2

United States Patent
Herr-Rathke et al.

(10) Patent No.: US 10,744,849 B2
(45) Date of Patent: Aug. 18, 2020

(54) CLOSED LOOP AUXILIARY HEATING CIRCUIT AND AN ELECTRIC MOTOR VEHICLE INCORPORATING THAT CIRCUIT

(71) Applicant: FORD GLOBAL TECHNOLOGIES, LLC, Dearborn, MI (US)

(72) Inventors: Jennifer A. Herr-Rathke, Plymouth, MI (US); Manfred Koberstein, Troy, MI (US); Mario Domonick Iaquinta, Bloomfield Township, MI (US); Jared Lynn Fromme, Sellersburg, IN (US); Curtis M. Jones, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 16/103,459

(22) Filed: Aug. 14, 2018

(65) Prior Publication Data
US 2020/0055371 A1 Feb. 20, 2020

(51) Int. Cl.
*B60H 1/00* (2006.01)
*B60H 1/14* (2006.01)

(52) U.S. Cl.
CPC ..... *B60H 1/00899* (2013.01); *B60H 1/00385* (2013.01); *B60H 1/143* (2013.01); *B60H 1/00007* (2013.01)

(58) Field of Classification Search
CPC .......... B60H 1/00889; B60H 1/00385; B60H 1/143; B60H 1/00007
USPC ....................................................... 165/202
See application file for complete search history.

(56) References Cited

U.S. PATENT DOCUMENTS

| 9,233,592 | B2 | 1/2016 | Larson |
| 2015/0089967 | A1 | 4/2015 | Kim et al. |
| 2015/0298523 | A1* | 10/2015 | Patel ................... B60H 1/00778 237/2 A |
| 2019/0105968 | A1* | 4/2019 | Rice ........................ B60L 58/26 |

FOREIGN PATENT DOCUMENTS

| CN | 104949385 A | 9/2015 |
| DE | 102014112201 A1 | 3/2016 |
| DE | 102015205891 A1 | 10/2016 |
| KR | 101544877 B1 | 8/2015 |

OTHER PUBLICATIONS

English Machine Translation of DE102015205891A1.
English Machine Translation of DE102014112201A1.
English Machine Translation of CN104949385A.
English Machine Translation of KR101544877B1.

(Continued)

*Primary Examiner* — Davis D Hwu
(74) *Attorney, Agent, or Firm* — David Coppiellie; King & Schickli, PLLC

(57) ABSTRACT

A closed loop auxiliary heating circuit includes a coolant, a closed loop coolant line and a pump for circulating the coolant through the closed loop coolant line between a computing device and an auxiliary heater core whereby heat is transferred from the computing device to the auxiliary heater core to heat the cabin of an electric motor vehicle. An electric motor vehicle incorporating the closed loop auxiliary heating circuit is also disclosed.

18 Claims, 3 Drawing Sheets

(56) References Cited

OTHER PUBLICATIONS

Leighton, Daniel; "Combined Fluid Loop Thermal Management for Electric Drive Vehicle Range Improvement"; SAE International; saepcmech.saejournals.org; Apr. 14, 2015; pp. 1-10.
Tuttle, Al; Electric Vehicle Heating and Cooling; Automotive IQ; https://www.automotive-iq.com/electrics-electronics/articles/electric-vehicle-heating-and-cooling; Nov. 21, 2017; pp. 1-6.

* cited by examiner

CLOSED LOOP AUXILIARY HEATING CIRCUIT AND AN ELECTRIC MOTOR VEHICLE INCORPORATING THAT CIRCUIT

TECHNICAL FIELD

This document relates generally to the motor vehicle field and, more particularly, to a closed loop auxiliary heating circuit for a passenger cabin of an electric motor vehicle as well as to a new and improved electric motor vehicle incorporating that closed loop auxiliary heating circuit.

BACKGROUND

Electrified vehicles include significant amounts of hardware dedicated to dissipating waste heat produced by onboard electrified systems. This waste heat is exchanged through coolant and various heat exchangers through the refrigeration system as well as to the ambient environment. In larger vehicles equipped with an auxiliary climate control systems, state of the art motor vehicles require two sets of coolant lines running to the back of the vehicle: one for the auxiliary heating system, and one for the electric vehicle (EV) cooling system. This adds significant cost, and importantly, extra weight which, in turn, reduces the electrified range of the electric vehicle.

Additionally, fully autonomous vehicles including, for example ride share vehicles of the future, incorporate additional electronics which produce even greater levels of waste heat to the point of becoming greater than the capacity of a single refrigeration system. As a result, full secondary refrigeration loops dedicated to cooling the electronics are being designed to maintain cabin comfort and the electronics in their proper operating temperature range.

This document relates to a closed loop auxiliary heating circuit that provides a new and improved solution to the waste heat problem characteristic of larger electric vehicles including, particularly, the autonomous vehicles of the future. That closed loop auxiliary heating circuit is not connected to the power train of the motor vehicle and its function is to cool the motor vehicle electronics and utilize the waste heat from those electronics to provide comfort to the cabin. Advantageously, such a closed loop auxiliary heating circuit functions to reduce the overall weight of the system by reducing one set of underbody heater lines and the associated coolant from the power train to the auxiliary climate system. This reduction of the underbody lines also improves the "external" package space and reduces the assembly complexity of the system.

In addition, a valve is provided to control the flow of coolant to the auxiliary heater core thereby allowing the closed loop auxiliary heating circuit to deliver the desired temperature of air to the cabin of the motor vehicle without the use of a blend door. This improves the internal package space required for the auxiliary climate system. This can be a substantial benefit given that the electronics package space required for the auxiliary climate system is in the same region of the motor vehicle as the auxiliary climate system. Utilizing the waste heat to cool the cabin also reduces the refrigeration work required of the refrigeration system in most ambient weather conditions. Advantageously this can lead to increases in the range of the electric motor vehicle.

SUMMARY

In accordance with the purposes and benefits described herein, a new and improved closed loop auxiliary heating circuit is provided for a passenger cabin of an electric motor vehicle. That closed loop auxiliary heating circuit comprises a coolant, a closed loop coolant line and a pump circulating the coolant through the closed loop coolant line between a computing device for the electric motor vehicle and an auxiliary heater core. This action functions to transfer heat from the computing device to the auxiliary heating core to heat the passenger cabin.

The closed loop auxiliary heating circuit may further include an auxiliary heater core bypass line. That auxiliary heater core bypass line has a first end branching from the closed loop coolant line between the computing device and the auxiliary heater core and a second end branching from the closed loop coolant line between the auxiliary heater core and the pump.

The closed loop auxiliary heating circuit may further include a flow control device at the first end of the auxiliary heater core bypass line. Further, the closed loop auxiliary heating circuit may further include an anti-flowback device at the second end of the auxiliary heater core bypass line.

Still further, the closed loop auxiliary heating circuit may further include a chiller on the auxiliary heater core bypass line between the first end and the second end whereby the coolant is cooled by means of a refrigerant in heat exchange relationship with the coolant in the chiller.

The closed loop auxiliary heating circuit may further include a control module configured to control operation of the pump and the flow control device.

Still further, the closed loop auxiliary heating circuit may further include a second electrical component on the closed loop coolant line. That second electrical component may be, for example, a battery for the electric motor vehicle. In such an embodiment that battery may be provided downstream from the pump and upstream from the computing device.

In accordance with yet another aspect, a new and improved electric motor vehicle is provided. That electric motor vehicle comprises (a) a primary heating circuit including a heat source and a primary heater core and (b) an auxiliary heating circuit. The auxiliary heating circuit is isolated from the primary heating circuit and adapted to heat a space inside the electric motor vehicle.

The auxiliary heating circuit of the electric motor vehicle may include a coolant, a closed loop coolant line and a pump circulating the coolant through the closed loop coolant line between a computing device and an auxiliary heater core whereby heat is transferred from the computing device to the auxiliary heating core to heat the cabin of the electric motor vehicle.

The auxiliary heating circuit may further include an auxiliary heater core bypass line having a first end branching from the closed loop coolant line between the computing device and the auxiliary heater core and a second end branching from the closed loop coolant line between the auxiliary heater core and the pump.

The auxiliary heating circuit may further include a flow control device at the first end of the auxiliary heater core bypass line. The auxiliary heating circuit may further include an anti-flowback device at the second end of the auxiliary heater core bypass line. In addition, the auxiliary heating circuit may further include a chiller on the auxiliary heater core bypass line between the first end and the second end whereby the coolant is cooled by means of a refrigerant in heat exchange relationship with the coolant in the chiller.

The auxiliary heating circuit of the electric motor vehicle may further include a control module configured to control operation of the pump and the flow control device. In addition, a second electrical component may be provided on the closed loop coolant line. That second electrical component may be a battery for the electric motor vehicle. In such an embodiment, that battery may be located downstream from the pump and upstream from the computing device.

In a battery electric vehicle (BEV), the heat source may comprise a positive temperature coefficient heater such as a high voltage positive temperature coefficient (HVPTC) heater. In a full hybrid electric vehicle (FHEV), the heat source may comprise a powertrain for the FHEV.

In the following description, there are shown and described several preferred embodiments of the closed loop auxiliary heating circuit and the electrified motor vehicle and the electric motor vehicle incorporating that circuit. As it should be realized, the closed loop auxiliary heating circuit and the electric vehicle are capable of other, different embodiments and their several details are capable of modification in various, obvious aspects all without departing from the closed loop auxiliary heating circuit and electric motor vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the closed loop auxiliary heating circuit and electric motor vehicle and together with the description serve to explain certain principles thereof.

Reference will now be made in detail to the present preferred embodiments of the closed loop auxiliary heating circuit and the electric motor vehicle incorporating that circuit, examples of which are illustrated in the accompanying drawing figures.

DETAILED DESCRIPTION

Figure 1:
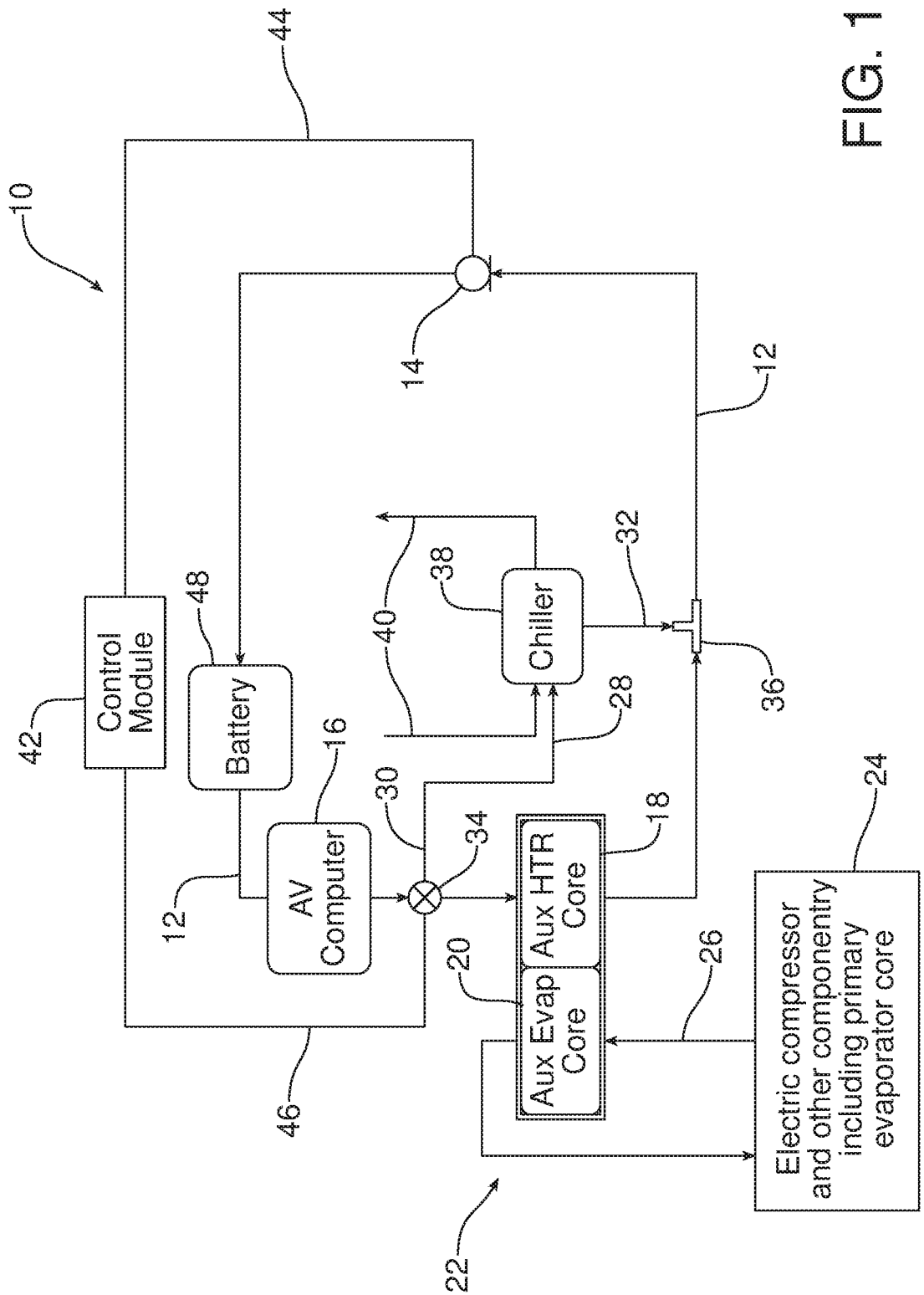
FIG. 1 is a schematic block diagram of the closed loop auxiliary heating circuit.

Reference is now made to FIG. 1 illustrating the new and improved closed loop auxiliary heating circuit 10 adapted for heating a cabin of an electric motor vehicle. The closed loop auxiliary heating circuit 10 includes a closed loop coolant line 12. A pump 14 circulates a coolant, such as Prestone CorGuard, through the closed loop coolant line 12 between a computing device 16 and an auxiliary heater core 18 whereby heat is transferred by the coolant from the computing device to the auxiliary heater core 18 and back again through the continuous closed loop coolant line 12.

The computing device 16 functions to control the operating systems of the electric motor vehicle. For purposes of this document the electric motor vehicle may be an autonomous motor vehicle having enhanced computing power. The computing device 16 may comprise one or more dedicated microprocessors and/or one or more electronic control units (ECU) operating in accordance with instructions from appropriate control software. Thus, the computing device may comprise one or more processors, one or more memories, and one or more network interfaces all in communication with each other over one or more communication buses.

The auxiliary heater core 18 is associated with a cooperating auxiliary evaporator core 20 connected to a state of the art refrigerant circuit 22 adapted to provide cooling to the cabin and various componentry 24 of the motor vehicle by circulating a refrigerant through the refrigerant line 26 in a manner known in the art. That componentry may include, for example, an electric compressor for the refrigerant and a primary evaporator core of the air conditioning system of the motor vehicle.

The closed loop auxiliary heating circuit 10 of the illustrated embodiment further includes an auxiliary heater core bypass line 28. The auxiliary heater core bypass line 28 has a first end 30 branching from the closed loop coolant line 12 between the computing device 16 and the auxiliary heater core 18 and a second end 32 branching from the closed loop coolant line between the auxiliary heater core and the pump 14.

The closed loop auxiliary heating circuit 10 also includes a flow control device 34 at the first end 30 of the auxiliary heater core bypass line 28 and an anti-flowback device 36 at the second end 32 of the auxiliary heater core bypass line. As will be described in greater detail below, the flow control device 34 may be incrementally adjusted to control the flow of coolant through the auxiliary heater core bypass line 28 around the auxiliary heater core 18. Thus, it should be appreciated that the flow control device 34 also controls the flow of coolant through the auxiliary heater core 18 thereby allowing for adjustment of heat transfer through the coolant at the auxiliary heater core 18 resulting in temperature control of the conditioned air being provided to the cabin of the electric motor vehicle. Advantageously this is done without the need for a blend door and the related control systems necessary for that door.

A chiller 38 is provided on the auxiliary heater core bypass line 28. A refrigerant is circulated to and from the chiller 38 through the refrigerant line 40. As the coolant is circulated through the chiller 38, heat is transferred from the coolant running through the auxiliary heater core bypass line 28 to the refrigerant running though the refrigerant line 40 so that the coolant is cooled. The anti-flowback device 36 ensures that coolant is circulated in the proper direction as indicated by the action arrows of the coolant line 12 from the anti-flowback device 36 toward the pump 14.

A control module 42 is connected to the pump 14 through the control line 44 and to the flow control device 34 by the control line 46. The control module 42 is configured to control operation of the pump 14 and the flow control device 34 in order to provide the desired level of cooling to the computing device 16 and the desired transfer of heat at the auxiliary heater core 18 for heating the cabin of the motor vehicle. The control module 42 comprises a computing device such as a dedicated microprocessor or ECU operating in accordance with instructions from appropriate control software. Thus, the control module 42 may comprise one or more processors, one or more memories and one or more network interfaces all in communication with each other over one or more communication buses. In some embodiments, the control module 42 may be an integral part of the computing device 16 instead of a separate device as shown in drawing FIG. 1.

As further shown in FIG. 1 it should be appreciated that a second electrical component may be provided on the closed loop coolant line 12 for cooling by the coolant being circulated through that line. In the illustrated embodiment, the second electrical component is a battery 48 adapted for powering all the systems of the electric motor vehicle. In the illustrated embodiment, the battery 48 is provided downstream from the pump 14 and upstream from the computing device 16.

Figure 2A:
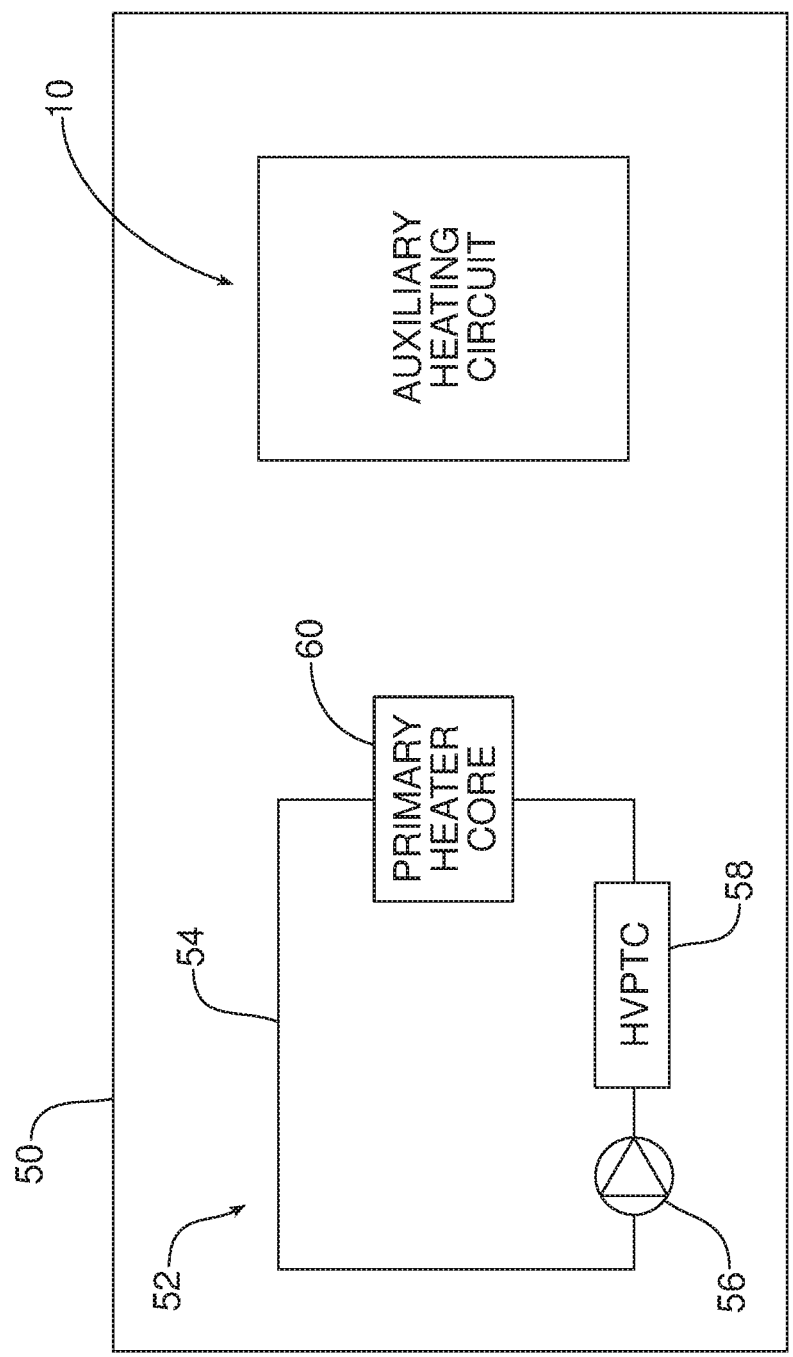
FIG. 2a is a schematic block diagram of a battery electric vehicle (BEV) incorporating (a) a primary heating circuit including a heat source, in the form of a positive temperature coefficient heater, and a primary heater core and (b) an auxiliary heating circuit isolated from the primary heating circuit.

Reference is now made to FIG. 2a which schematically illustrates a battery electric vehicle (BEV) 50. The BEV 50 includes a primary heating circuit 52 with a closed-loop coolant line 54. A pump 56 circulates coolant though the closed-loop coolant line 54 through (a) a heat source, in the form of a positive temperature coefficient heater such as the high voltage positive temperature coefficient (HVPTC) heater 58 illustrated, and (b) a primary heater core 60. The BEV also includes an auxiliary heating circuit 10 of the type illustrated in FIG. 1 that is isolated from the primary heating circuit 52 and adapted to heat a space, such as a part of the passenger cabin, inside the electric motor vehicle.

Figure 2B:
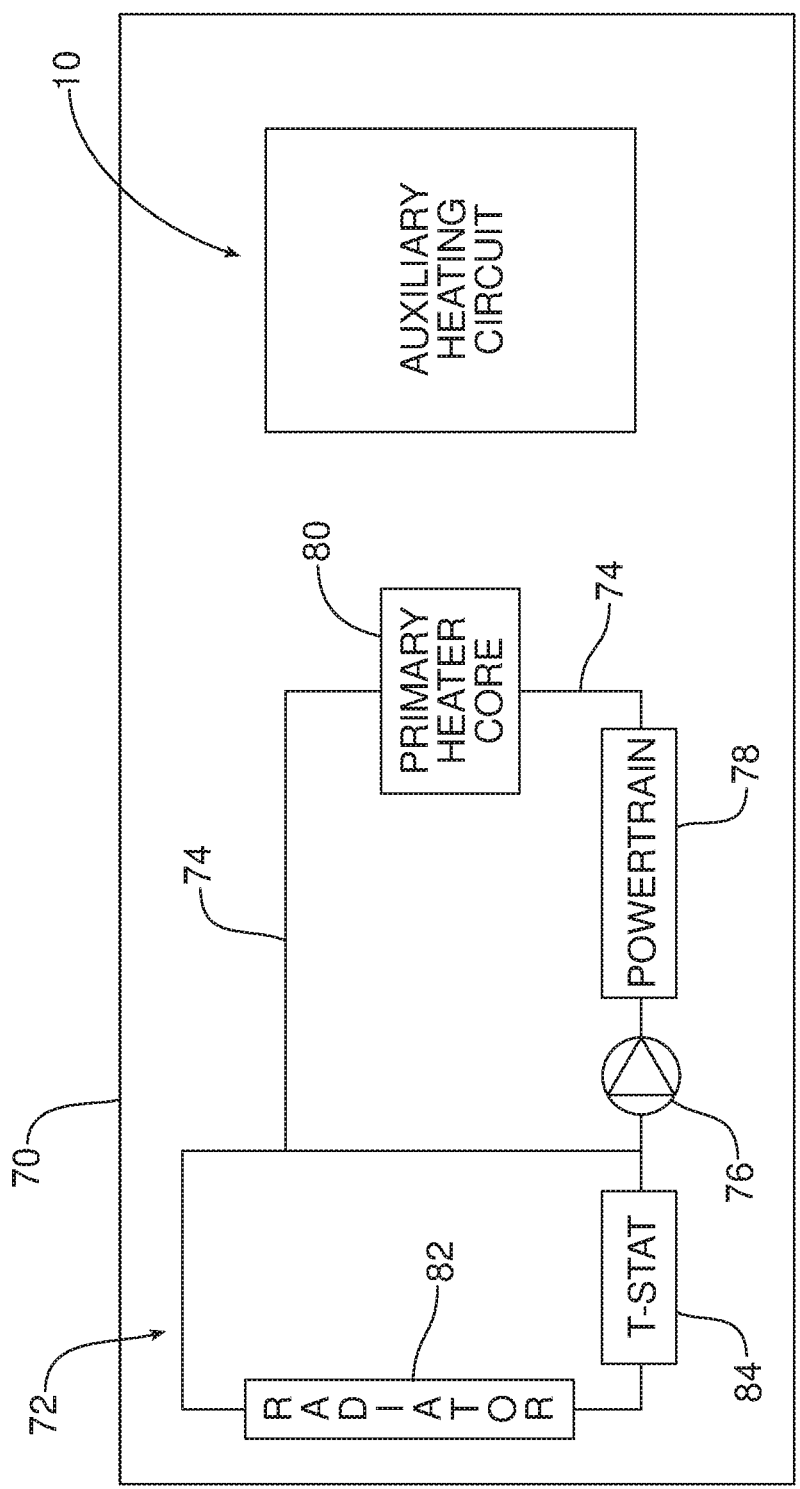
FIG. 2b is a schematic block diagram of a full hybrid electric vehicle (FHEV) incorporating (a) a primary heating circuit including a heat source, in the form of a motor vehicle powertrain, and a primary heater core and (b) an auxiliary heating circuit isolated from the primary heating circuit.

Reference is now made to FIG. 2b which schematically illustrates a full hybrid electric vehicle (FHEV) 70. The FHEV 70 includes a primary heating circuit 72 with a closed loop coolant line 74. A pump 76 circulates coolant through the closed-loop coolant line 74 through a heat source, in the form of a powertrain 78 for the FHEV 70, a primary heater core 80, a radiator 82 and a thermostat 84. The FHEV 70 also includes an auxiliary heating circuit 10 of the type illustrated in FIG. 1 that is isolated from the primary heating circuit 52 and adapted to heat a space, such as a part of the passenger cabin, inside the electric motor vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A closed loop auxiliary heating circuit for a cabin of an electric motor vehicle, comprising:
    a coolant;
    a closed loop coolant line;
    a pump circulating said coolant through said closed loop coolant line between a computing device and an auxiliary heater core whereby heat is transferred from said computing device to said auxiliary heater core to heat said cabin; and
    an auxiliary heater core bypass line having a first end branching from said closed loop coolant line between said computing device and said auxiliary heater core and a second end branching from said closed loop coolant line between said auxiliary heater core and said pump.

2. The closed loop auxiliary heating circuit of claim 1, further including a flow control device at said first end of said auxiliary heater core bypass line.

3. The closed loop auxiliary heating circuit of claim 2, further including an anti-flowback device at said second end of said auxiliary heater core bypass line.

4. The closed loop auxiliary heating circuit of claim 3, further including a chiller on said auxiliary heater core bypass line between said first end and said second end whereby said coolant is cooled.

5. The closed loop auxiliary heating circuit of claim 4, further including a control module configured to control operation of said pump and said flow control device.

6. The closed loop auxiliary heating circuit of claim 5, further including a second electrical component on said closed loop coolant line.

7. The closed loop auxiliary heating circuit of claim 6, wherein said second electrical component is a battery for said electric motor vehicle.

8. The closed loop auxiliary heating circuit of claim 7, wherein said battery is downstream from said pump and upstream from said computing device.

9. An electric motor vehicle, comprising:
    a primary heating circuit including a heat source and a primary heater core; and
    an auxiliary heating circuit isolated from said primary heating circuit and adapted to heat a space inside said electric motor vehicle wherein said auxiliary heating circuit includes a coolant, a closed loop coolant line and a pump circulating said coolant through said closed loop coolant line between a computing device and an auxiliary heater core whereby heat is transferred from said computing device to said auxiliary heating core to heat said space inside said electric motor vehicle.

10. The electric motor vehicle of claim 9, wherein said auxiliary heating circuit further includes an auxiliary heater core bypass line having a first end branching from said closed loop coolant line between said computing device and said auxiliary heater core and a second end branching from said closed loop coolant line between said auxiliary heater core and said pump.

11. The electric motor vehicle of claim 10, wherein said auxiliary heating circuit further includes a flow control device at said first end of said auxiliary heater core bypass line.

12. The electric motor vehicle of claim 11, wherein said auxiliary heating circuit further includes an anti-flowback device at said second end of said auxiliary heater core bypass line.

13. The electric motor vehicle of claim 12, wherein said auxiliary heating circuit further includes a chiller on said auxiliary heater core bypass line between said first end and said second end whereby said coolant is cooled.

14. The electric motor vehicle of claim 13, wherein said auxiliary heating circuit further includes a control module configured to control operation of said pump and said flow control device.

15. The electric motor vehicle of claim 14, further including a second electrical component on said closed loop coolant line.

16. The electric motor vehicle of claim 15, wherein said second electrical component is a battery for said electric motor vehicle.

17. The electric motor vehicle of claim 16, wherein said battery is downstream from said pump and upstream from said computing device.

18. The electric motor vehicle of claim 17, wherein said heat source is selected from a group consisting of a powertrain, a positive temperature coefficient heater and combinations thereof.

* * * * *